United States Patent
Hellholm et al.

(10) Patent No.: US 9,333,997 B2
(45) Date of Patent: *May 10, 2016

(54) ARTICULATED TRACKED VEHICLE

(71) Applicant: BAE SYSTEMS HAGGLUNDS AKTIEBOLAG, Ornskoldsvik (SE)

(72) Inventors: Bjorn Hellholm, Arnasvall (SE); Gustav Soderstrom, Ornskoldsvik (SE)

(73) Assignee: BAE Systems Hägglunds Aktiebolag, Oernskoeldsvik (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/632,397

(22) Filed: Feb. 26, 2015

(65) Prior Publication Data

US 2015/0166131 A1 Jun. 18, 2015

Related U.S. Application Data

(63) Continuation of application No. 13/382,653, filed as application No. PCT/SE2010/050782 on Jul. 6, 2010, now Pat. No. 8,991,528.

(30) Foreign Application Priority Data

Jul. 7, 2009 (SE) ..................... 0950530

(51) Int. Cl.
*B62D 55/065* (2006.01)
*B60K 6/46* (2007.10)
(Continued)

(52) U.S. Cl.
CPC .............. *B62D 55/0655* (2013.01); *B60K 6/46* (2013.01); *B60K 6/48* (2013.01); *B60L 11/005* (2013.01);
(Continued)

(58) Field of Classification Search
CPC .... B62D 55/0655; B60K 7/00; B60K 7/0015; B60K 7/0007
See application file for complete search history.

(56) References Cited

U.S. PATENT DOCUMENTS 3,215,219 A * 11/1965 Forsyth et al. ............... 180/14.3
4,072,203 A * 2/1978 Pierson ....................... 180/9.44
(Continued)

FOREIGN PATENT DOCUMENTS

EP 1112913 7/2001
EP 1918180 5/2008
(Continued)

OTHER PUBLICATIONS

International Search Report for corresponding Patent Application No. PCT/SE2010/050782 dated Sep. 21, 2010.
(Continued)

*Primary Examiner* — Kevin Hurley
*Assistant Examiner* — Gabriela C Craciun
(74) *Attorney, Agent, or Firm* — Renner, Otto, Boisselle & Sklar, LLP (57) ABSTRACT

An articulated tracked vehicle comprising a first vehicle unit and a second vehicle unit controllably connected by means of a control member, wherein each vehicle unit comprises two driven tracks driven by drive wheels and has one electric motor per track for driving respective drive wheel via drive shafts for propulsion of the vehicle, wherein the first vehicle unit comprises a combustion engine, wherein the combustion engine is arranged to drive a generator for electric power generation, wherein the generator is arranged to transfer electric power via power electronics to the electric motors of each vehicle unit, wherein propulsion of the vehicle is arranged to be effected only electrically, and wherein power transfer between said vehicle units is arranged to be effected only electrically.

6 Claims, 4 Drawing Sheets (51) Int. Cl.
  *B60L 11/00*    (2006.01)
  *B60L 11/12*    (2006.01)
  *B60K 6/48*     (2007.10)

(52) U.S. Cl.
  CPC ......... *B60L 11/123* (2013.01); *B60Y 2200/147* (2013.01); *Y02T 10/6217* (2013.01); *Y02T 10/7022* (2013.01); *Y02T 10/7077* (2013.01); *Y10S 903/903* (2013.01)

(56) References Cited

U.S. PATENT DOCUMENTS

| | | | | |
|---|---|---|---|---|
| 4,762,191 | A * | 8/1988 | Hagin et al. | 180/14.2 |
| 4,966,242 | A * | 10/1990 | Baillargeon | 180/9.44 |
| 6,419,037 | B1 * | 7/2002 | Kramer et al. | 180/14.2 |
| 6,523,629 | B1 * | 2/2003 | Buttz et al. | 180/167 |
| 7,147,070 | B2 | 12/2006 | Leclerc | |
| 2004/0225435 | A1 * | 11/2004 | Ogawa et al. | 701/200 |
| 2004/0226760 | A1 * | 11/2004 | Loh et al. | 180/6.7 |
| 2006/0113121 | A1 * | 6/2006 | Radke et al. | 180/9.44 |
| 2006/0124380 | A1 * | 6/2006 | Radke et al. | 180/301 |
| 2006/0191168 | A1 * | 8/2006 | Casey et al. | 37/348 |
| 2007/0080236 | A1 * | 4/2007 | Betz et al. | 237/12.1 |
| 2010/0044124 | A1 * | 2/2010 | Radke et al. | 180/9.54 |
| 2012/0073896 | A1 * | 3/2012 | Skoff | 180/400 |
| 2012/0168234 | A1 * | 7/2012 | Hellholm et al. | 180/14.2 |
| 2012/0271521 | A1 * | 10/2012 | Nordberg | 701/69 |

FOREIGN PATENT DOCUMENTS

| | | |
|---|---|---|
| SE | 509847 | 3/1999 |
| WO | 2009/108089 | 9/2009 |
| WO | 2009/108104 | 9/2009 |

OTHER PUBLICATIONS

Singapore Search Report for corresponding Patent Application No. 201109046-1 dated Feb. 11, 2013.
Office Action for corresponding Patent Application No. 1150957-7 dated Feb. 13, 2012.

* cited by examiner

ARTICULATED TRACKED VEHICLE

RELATED APPLICATION DATA

This application is a continuation of U.S. patent application Ser. No. 13/382,653 filed Mar. 19, 2012, which was a national phase of International Application No. PCT/SE10/050782 filed Jul. 6, 2010, which claimed priority of Swedish Application No. 0950530-6 filed Jul. 7, 2009, all of which are hereby incorporated herein by reference.

TECHNICAL FIELD

The invention relates to an articulated tracked vehicle.

BACKGROUND ART

Articulated tracked vehicles comprising a front vehicle unit and a rear vehicle unit controllably interconnected by means of a control coupling, wherein the vehicle comprises a driveline for driving the vehicle are known. The driveline comprises according to prior art a diesel engine, a gearbox connected to the diesel engine, distribution gear, and shaft gears for front and rear vehicle units, the shaft gears being arranged to distribute the power to the respective track of the vehicle. Such a driveline occupies relatively large space and is relatively heavy.

U.S. Pat. No. 6,880,651 B2 discloses an articulated tracked vehicle with a driveline system having a first driveline comprising a diesel engine arranged in the front vehicle unit and a second driveline comprising an electric motor/generator arranged in the rear vehicle unit. In the first driveline the diesel engine is arranged to drive a gear box which in turn is connected to a drop box arranged to drive a drive shaft being connected to the front shaft gear and rear shaft gear distributing the power to the respective track. In the second driveline the drive shaft is connected to the electric motor/generator, wherein the electric motor is arranged to be driven by means of energy from a battery pack or a capacitor such that the tracks may be driven by means of the electric motor. The first and second vehicle units may be disengaged wherein the respective vehicle unit may be driven by itself. Further the diesel engine and/or the electric motor may drive both vehicle units when the vehicle units are interconnected. A disadvantage with such a construction is that it occupies a lot of space due to among others double drivelines and is also relatively heavy. Further batteries or a corresponding energy source are required in order to energize the electric motor, which also occupies space.

SUMMARY OF THE INVENTION

The present invention provides an articulated tracked vehicle with a driveline which facilitates compact building-in in the vehicle such that space in the vehicle may be used more efficiently, and facilitates improved efficiency of the vehicle.

According to an embodiment the objects are achieved with an articulated tracked vehicle comprising a first vehicle unit and a second vehicle unit controllably connected by means of a control member, wherein the first vehicle unit comprises a combustion engine, wherein the combustion engine is arranged to drive a generator for electrical generation, wherein the generator is arranged to transfer power via power electronic means to at least one electric motor of at least one electric propulsion unit.

Hereby no mechanical transmission of power is required from the combustion engine to drive wheels of the vehicle, wherein relatively optional placement of components such as propulsion motor and power electronic means is facilitated, which in turn facilitates compact building-in in the vehicle and thus space saving such that more space for e.g. crew and/or payload is obtained. Further efficient drive of the vehicle is facilitated by utilizing electric motor in combination with the combustion engine according to above.

According to an embodiment of the articulated tracked vehicle said propulsion unit comprises a transmission configuration arranged to transfer power for propulsion of the vehicle. Hereby more efficient drive of the vehicle is facilitated.

According to an embodiment of the articulated tracked vehicle the transmission configuration comprises at least one planetary gearing. By using planetary gearing the transmission configuration may be constructed more compact which results in saving of space.

According to an embodiment the articulated tracked vehicle comprises an electric motor per propulsion unit. This results in a more efficient drive and a compact construction.

According to an embodiment the articulated tracked vehicle comprises two tracks per vehicle unit. This results in stable drive of the tracked vehicle.

According to an embodiment the tracked vehicle comprises an electric motor per tracked drive wheel and drive shaft. Hereby the driveline may be formed very compact which results in good space for housing of crew and/or payload. Due to the fact that one electric motor is arranged per tracked drive wheel individual control of the respective track is facilitated. Hereby pivot turn of the articulated vehicle may be provided, at least with the front vehicle unit separated. Further steering of the vehicle by means of steering of the respective track is facilitated, which results in the advantage that in case the steering of the vehicle control coupling/control member would fail, redundancy in the form of control by means of the respective track exists.

According to an embodiment the articulated tracked vehicle comprises an electric motor per vehicle unit. Hereby the driveline may be compactly formed which results in good saving of space for crew and/or payload.

According to an embodiment the articulated tracked vehicle comprises an electric motor per pair of first and second, and third and fourth drive shaft respectively. This results in compact design and consequently saving of space.

According to an embodiment of the articulated tracked vehicle each electric motor is arranged to drive a shaft running in the longitudinal direction of the vehicle. Hereby shaft and differential of a conventional driveline may at least to a certain extent be utilized which results in easy and cost efficient upgrading of a conventional articulated tracked vehicle.

According to an embodiment the articulated tracked vehicle comprises only one electric motor which is arranged in the first vehicle unit. Hereby a compact and consequently space saving solution is facilitated.

According to an embodiment of the articulated tracked vehicle the electric motor is arranged to drive a shaft running in the longitudinal direction of the vehicle. Hereby shaft and differential of a conventional driveline may at least to a certain extent be utilized which results in easy and cost efficient upgrading of a conventional articulated tracked vehicle.

According to an embodiment the articulated tracked vehicle comprises only one electric motor which is arranged in the second vehicle unit. Hereby a compact and consequently space saving solution is facilitated.

According to an embodiment of the articulated tracked vehicle the combustion engine is arranged to drive a shaft running in the longitudinal direction of the vehicle. Hereby shaft and differential of a conventional driveline may at least to a certain extent be utilized which results in easy and cost efficient upgrading of a conventional articulated tracked vehicle.

Articulated tracked vehicle according to any preceding claims, comprising an energy storage unit arranged to supply energy to said power electronic means. Hereby drive of the vehicle with the combustion engine shut off is facilitated wherein more silent drive is facilitated.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which:

FIG. 1b schematically illustrates a cross section of a propulsion unit of the driveline according to FIG. 1a;

FIG. 2b schematically illustrates a cross section of a propulsion unit of the driveline according to FIG. 2a;

DETAILED DESCRIPTION

FIG. 1a, 2a, 3-5 schematically illustrate an articulated tracked vehicle I; II; III; IV; V with a driveline according to different embodiments of the present invention. The tracked vehicle I; II; III; IV; V according to the embodiments below comprise a first front vehicle unit 1 and a second rear vehicle unit 2 controllably interconnected by means of control coupling/control member 3.

The front vehicle unit 1 has a first track 4a arranged to be driven by means of a first drive wheel 5a connected to a first drive shaft 6a and a second track 4b arranged to be driven by means of a second drive wheel 5b connected to a second drive shaft 6b. The rear vehicle unit 2 has a third track 5c arranged to be driven by means of a third drive wheel 5c connected to a third drive shaft 6c and a fourth track 5d arranged to be driven by means of a fourth drive wheel 5d connected to a fourth drive shaft 6d.

The driveline comprises a combustion engine 10, according to an embodiment a diesel engine, arranged to drive a generator 132 for electric generation, wherein the generator is arranged to transfer power via power electronic means 20 to at least one propulsion motor.

The articulated vehicle I; II; III; IV; V according to the present invention comprises according to an embodiment an electronic control unit 30 arranged to control the combustion engine 10 and power electronic means 20 for controlling propulsion motor.

The articulated vehicle I; II; III; IV; V according to an embodiment further comprises an actuator 40 for power request, the actuator according to an embodiment comprising a gas trigger, such as an accelerator pedal. Power request is generated on the basis of an action performed by the driver corresponding to a desire of the driver to give power to the vehicle for propulsion of the same. The actuator comprises according to a variant means for actuating drive of the respective propulsion member/electric motor, which according to a variant is provided by a control panel or the corresponding, from which a request for desired control is requested, wherein information is treated and transferred to the power electronic means 20, wherein information/power is forwarded to the propulsion motor/electric motor.

The electronic control unit is signal connected to the actuator 40 for power request via a link. A driver of the vehicle may request a power to the combustion engine 10 by means of the actuator. A driver of the vehicle may request drive of propulsion motor by means of the actuator 40. The electronic control unit 30 is arranged to receive data representing requested power from the actuator 40. The electronic control unit 30 is arranged to communicate via a link with the power electronic means 20 wherein the requested power is compared to required power. If required power is not sufficient the electronic control unit 30 is arranged to communicate with the combustion engine 10 to increase the rotational speed for increased power, wherein increased power is sent to the generator 12 which transfers the power to the power electronics 20 for forwarding to electric motor for drive of the vehicle.

According to a variant of the present invention such as described in the embodiments below the driveline comprises an energy storage unit 50 arranged to store energy. The energy storage unit is connected to said power electronic means 20 via a link for supplying the power electronic means with power. The energy storage unit 50 is arranged to store energy e.g. when the vehicle is braking, wherein the electric motor acts as generator such that the electric motor then generates a current which is arranged to be stored in the energy storage unit 50.

By the energy storage unit 50 drive of the vehicle with the combustion engine shut off is facilitated wherein more silent drive is facilitated.

The energy storage unit 50 according to the variant of the present invention as described in the embodiments below may be any suitable energy storage unit 50. According to a variant the energy storage unit is constituted by a battery or battery pack. According to an alternative variant the energy storage unit is constituted by a capacitor such as a super capacitor.

Herein the term "link" is referred to as a communication link which may be a physical line, such as an opto-electronic communication line, or a non-physical line, such as a wireless connection, e.g. a radio link or microwave link.

Herein the term "propulsion motor" is referred to as an electric motor for propulsion of the articulated tracked vehicle according to the present invention.

Herein the term "power electronic means" and "power electronic unit" are referred to as means/unit which among others is configured to convert alternating voltage/alternating current to continuous voltage/continuous current and vice versa, configured to transform up or down voltage, and facilitates connection to energy storage unit such as battery, capacitor or the corresponding. Further the means is configured to control rotational speed/torque of electric motors, i.e. power. The power electronic means/power electronic unit is e.g. arranged to convert alternating current from a generator to continuous current for supply of e.g. lamps, radio and the like; converting high voltage, e.g. 500 or 600 V, to lower voltage, e.g. 12, 24 or 48 V; converting low voltage, e.g. 12, 24 or 48 V, from energy storage unit to high voltage, e.g. 500 or 600 V; and transferring high voltage to electric motors.

Figure 1A:
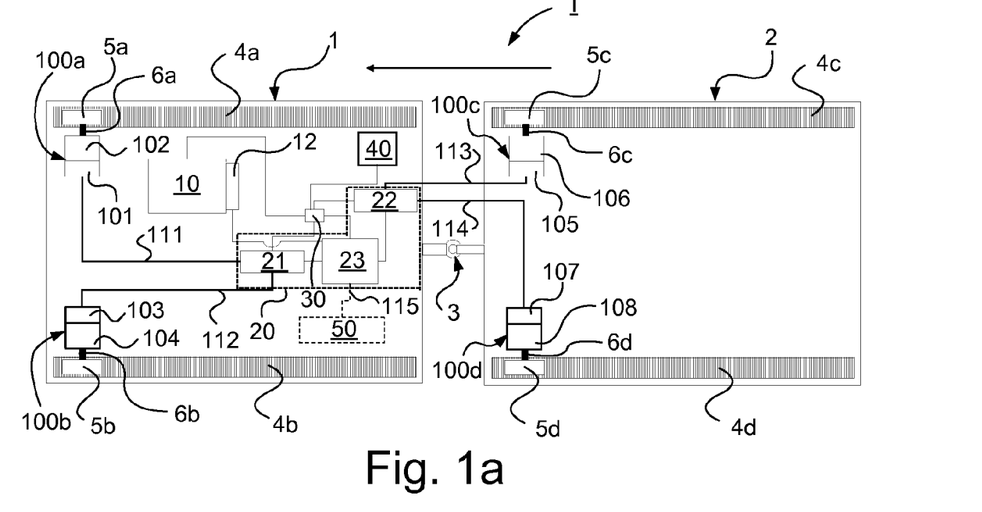
FIG. 1a schematically illustrates an articulated tracked vehicle with a driveline according to a first embodiment of the present invention.

FIG. 1a schematically illustrates an articulated tracked vehicle I with a driveline according to a first embodiment of the present invention.

The driveline comprises a combustion engine 10, e.g. a diesel engine, and a generator, wherein the combustion engine 10 is arranged to drive the generator 12.

The driveline further comprises a first electric propulsion unit 100a comprising a first propulsion motor 101 and a first transmission configuration 102 connected to the first drive shaft 6a and arranged to drive the first drive wheel 5a. The driveline further comprises a second electric propulsion unit 100b comprising a second propulsion motor 103 and a transmission configuration 104 connected to the second drive shaft 6b and arranged to drive the second drive wheel 5b. The driveline further comprises a third propulsion unit 100c comprising a third propulsion motor 105 and a third transmission configuration 106 connected to the third drive shaft 6c and arranged to dive the third drive wheel 6c. The driveline further comprises a fourth electric propulsion unit 100d comprising a fourth propulsion motor 107 and a fourth transmission configuration 108 connected to the fourth drive shaft 6d and arranged to drive the fourth drive wheel 5d.

The driveline further comprises power electronic means 20 connected to the generator 12 and arranged to receive power from the generator 12, wherein said power electronic means 20 are arranged to transfer power to the respective propulsion motor 101, 103, 105, 107.

The power electronic means 20 comprises a first power electronic unit 21, a second power electronic unit 22 and a third power electronic unit 23, the first, second and third power electronic units being connected to each other. The first power electronic unit 21 is arranged to transfer power to the first propulsion motor 101 via a first link 111. The first power electronic unit 21 is further arranged to transfer power to the second propulsion motor 103 via a second link 112. The second power electronic unit 22 is arranged to transfer power to the third propulsion motor 105 via a third link 113. The second power electronic unit 22 is further arranged to transfer power to the fourth propulsion motor 107 via a fourth link 114.

According to an alternative variant the first, second and third power electronic units 21, 22, 23 could be constituted by a single power electronic unit.

Figure 1B:
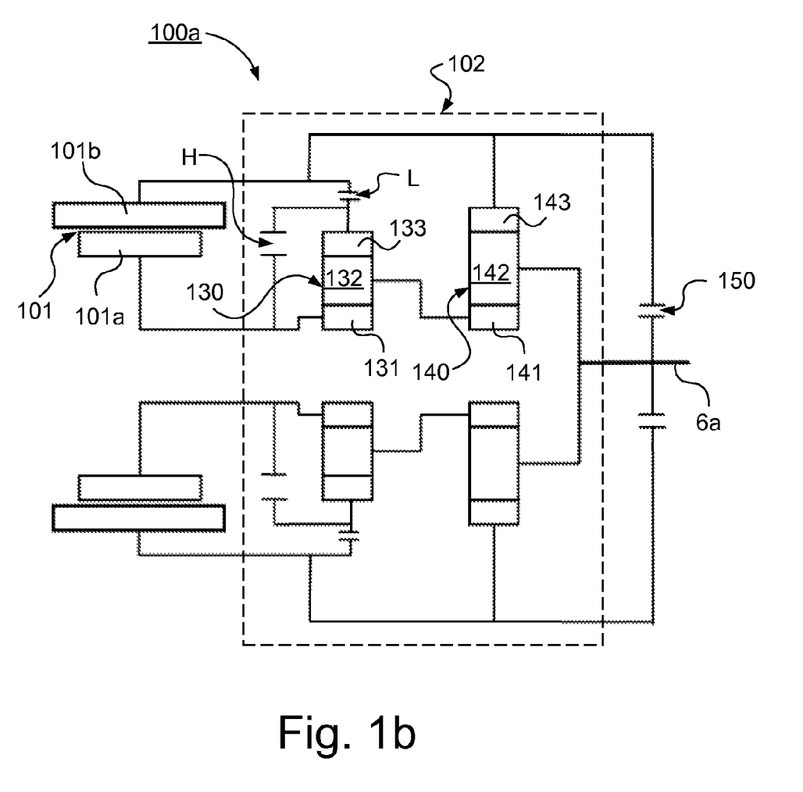

The respective propulsion motor is here constituted by an electric motor for propulsion of the articulated tracked vehicle I. In the respective electric propulsion unit 100a, 100b, 100c, 100d the respective propulsion motor 101, 103, 105, 107 is connected to the respective transmission configuration 102, 104, 106, 108. An embodiment of an electric propulsion unit 100a for the first embodiment is illustrated in FIG. 1 b, described below.

The articulated tracked vehicle I further comprises the electronic control unit 30. The electronic control unit 30 is signal connected to the combustion engine 10 for controlling the combustion engine 10 via a link. The electronic control unit 30 is further signal connected to said power electronic means 20 wherein the electronic control unit 30 is arranged to control the first power electronic unit 21 via a link, the second power electronic unit 22 via a link, and the third power electronic unit 23 via a link. The electronic control unit 30 is arranged to communicate between the combustion engine 10 and power electronic means 20. The electronic control unit 30 is signal connected to the actuator 40 for power request via a link.

According to a variant the electronic control unit 30 and the power electronic means 20 could be constituted by a common unit for control and communication between combustion engine 10 and propulsion motors 101, 103, 105, 107, wherein said common unit is connected to the combustion engine 10, generator 12, propulsion motors 101, 103, 105, 107 and actuator 40.

Due to the fact that the combustion engine 10 is arranged to drive a generator 12 which then transfers power to said power electronics generating power to the propulsion motor no mechanical power transmission is required from the combustion engine 10 to the drive wheel 5a, 5b, 5c, 5d. Hereby relatively free placement of components such as electric propulsion unit and power electronic means is facilitated.

According to a variant of the first embodiment the driveline comprises an energy storage unit 50 arranged to store energy. The energy storage unit 50 is connected to the third power electronic unit 23 via a link 115 for supplying the power electronic means with power. Hereby drive of the vehicle I with the combustion engine 10 shut off is facilitated wherein more silent drive is facilitated.

By using an electric propulsion motor 101, 103, 105, 107 according to the first embodiment, i.e. an electric motor, per track 4a, 4b, 4c, 4d, the driveline may be designed very compact which results in good space for housing of crew and/or payload. By having a propulsion motor, i.e. an electric motor, arranged per track individual control of the respective track is facilitated. Hereby a pivot turn of the articulated tracked vehicle would be obtainable. Further the vehicle I would be steerable by means of control of each track, which results in the advantage that in case of failure of the steering of the control coupling/control member 3, redundancy in the form a steering by means of the respective track 4a, 4b, 4c, 4d exists.

According to a variant each propulsion motor may be individually controlled via the actuator 40, wherein the control commands from the actuator 40 are processed in the electronic control unit 30 for transmission of power to the respective power electronic unit 21, 22, 23 of the power electronic means 20. Hereby is facilitated to obtain an open as well as a locked differential for the entire articulated tracked vehicle I.

FIG. 1b schematically illustrates a cross section of an electric propulsion unit 100a as the first electric propulsion unit 100a of the driveline according to FIG. 1a.

The electric propulsion unit 100a comprises a propulsion motor 101, i.e. an electric motor for propulsion of the articulated tracked vehicle I. The propulsion motor 101 has a rotor 101a arranged to rotate and a stator 101b being fixedly secured, e.g. in a housing of a gearbox.

The electric propulsion unit 100a further comprises a transmission configuration 102 connected to the propulsion motor 101 and arranged to transfer the rotational speed from the rotor 101a of the propulsion motor to the drive shaft for driving of the drive wheel.

The transmission configuration 102 comprises a planetary gearing 130 connected to the rotor 101a. The planetary gearing 130 comprises a sun wheel 131, planet wheels 132 and a ring wheel 133. The sun wheel 131 is connected to the rotor 101a via a shaft such that the sun wheel 131 is arranged to be rotated by means of the rotor 101a. The transmission configuration 102 has a high gear position H in which the entire planetary gearing 130 with the ring wheel 133 rotates with an input shaft of the planetary gearing running from the rotor 101a to the sun wheel 131 of the planetary gearing 130. The planetary gearing 130 further has a low gear position L in which the ring wheel 133 is locked and the planet wheels 132 rotate with the sun wheel 131 which provides a gear reduction on the drive shaft 6a such that it rotates with a lower rotational speed.

The transmission configuration 102 also comprises a reduction gear 140 connected to the planetary gearing 130 and the drive shaft 6a. The reduction gear 140 is arranged to reduce the rotation coming from the planetary gearing 130 such that a lower rotational speed but higher torque is provided. The reduction gear 140 comprises a sun wheel, planet wheels 142 and a ring wheel 143. The reduction gear 140 is connected to the drive shaft 6a via its planet wheel 142 for providing a gear reduction. In the high gear position H of the transmission configuration the sun wheel 141 of the reduction gear 140 rotates with a higher rotational speed compared to the low gear position L. The ring wheel 143 is always locked to the housing of the gear box independent of high gear position H or low gear position L.

The reduction gear is a type of planetary gearing. The respective transmission configuration 102, 104, 106, 108 of the first embodiment is built up of planetary gearing/reduction gear 130/140. Thereby a compact construction is obtained which results in more space for crew and/or payload.

The articulated vehicle I comprises a brake device 150 arranged to brake the drive shaft 6a. Any suitable brake device could be used, such as wheel brake drum, electric brake, disc brake or wet brake.

Above a transmission configuration 102 suitable for the first embodiment of the present invention has been described. Any suitable configuration of an electric propulsion unit 100a/transmission configuration 102 could be used though.

Figure 2A:
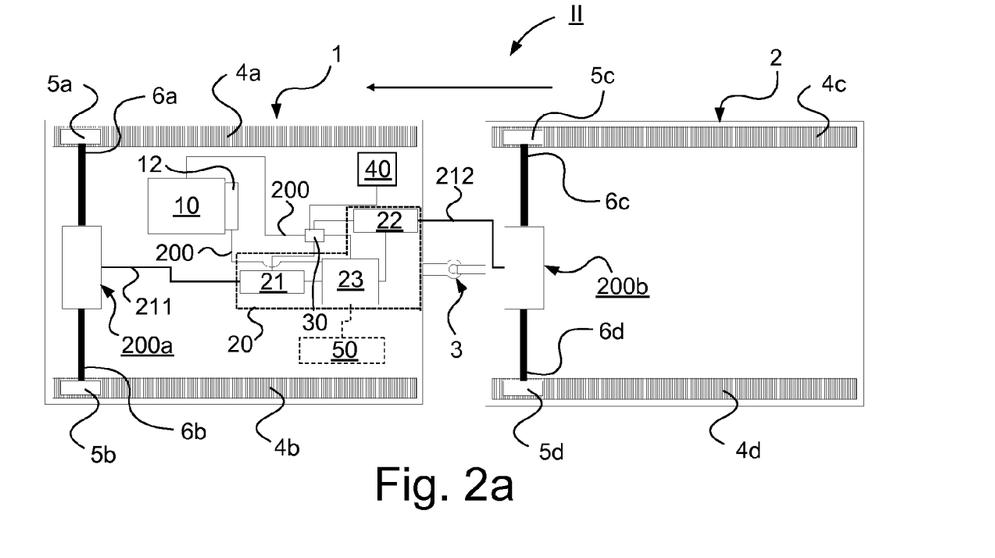
FIG. 2a schematically illustrates an articulated tracked vehicle with a driveline according to a second embodiment of the present invention.

FIG. 2a schematically illustrates an articulated tracked vehicle II with a driveline according to a second embodiment of the present invention.

The driveline comprises a combustion engine 10, e.g. a diesel engine, and a generator 12 for electric generation, wherein the combustion engine 10 is arranged to drive the generator 12.

The driveline further comprises a first electric propulsion unit 200a comprising a first propulsion motor connected to the first and second drive shaft 6a, 6b and arranged to drive the first and second drive wheel 5a, 5b. The driveline further comprises a second electric propulsion unit 200b comprising a second propulsion motor connected to the third and fourth drive shaft 6c, 6d and arranged to drive the third and fourth drive wheel 5c, 5d. Each electric propulsion unit further comprises a transmission configuration.

The driveline further comprises power electronic means 20 connected to the generator 12 via a link and arranged to receive power from the generator 12, wherein said power electronic means 20 is arranged to transfer power to the respective propulsion motor 200a, 200b. The power electronic means 20 comprises a first power electronic unit 21, a second power electronic unit 22 and a third power electronic unit 23, the first, second and third power electronic unit being connected to each other. The first power electronic unit 21 is arranged to transfer power to the first propulsion motor 200a via a first link 211. The second power electronic unit 22 is arranged to transfer power to the second propulsion motor 200b via a second link 212.

Figure 2B:
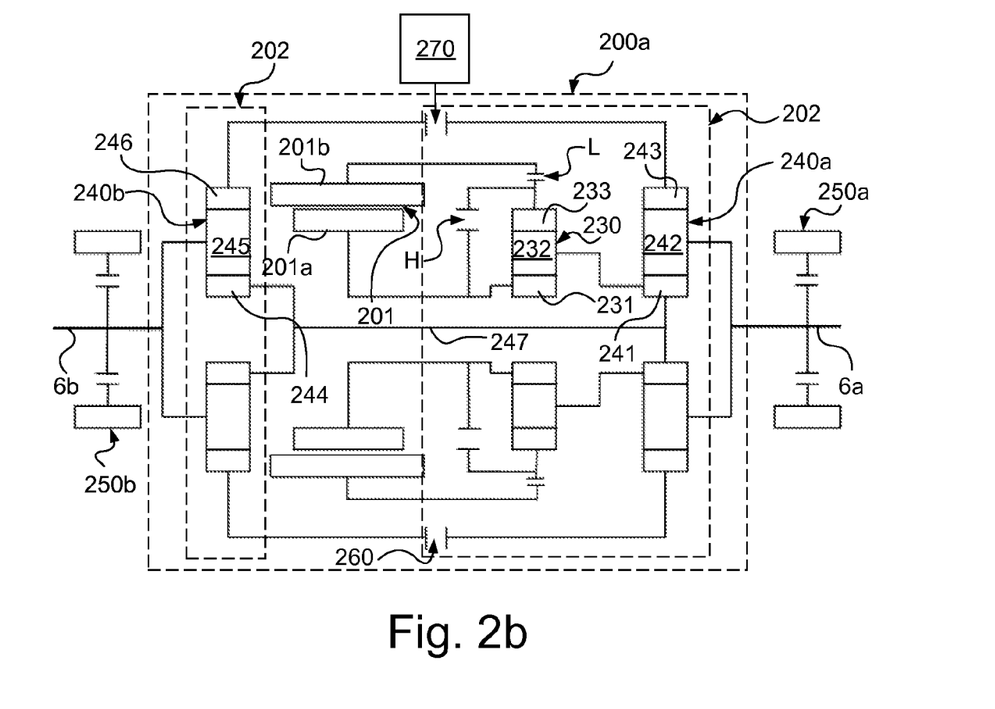

Each propulsion motor of the respective electric propulsion unit 200a, 200b are here constituted by an electric motor for propulsion of the articulated tracked vehicle II. An embodiment of electric propulsion unit 200a for the second embodiment is illustrated in FIG. 2b, described below.

The articulated vehicle II further comprises the electronic control unit 30. The electronic control unit 30 is signal connected to the combustion engine 10 for controlling the combustion engine 10 via a link. The electronic control unit 30 is further signal connected to said power electronic means 20 wherein the electronic control unit 30 is arranged to control the first power electronic unit via a link, the second power electronic unit via a link, and the third power electronic unit via a link. The electronic control unit 30 is arranged to communicate between combustion engine 10 and power electronic means 20. The electronic control unit 30 is signal connected to the actuator 40 for power request via a link.

According to a variant the electronic control unit 30 and the power electronic means 20 could be constituted by a common unit for control and communication between combustion engine 10 and propulsion motors, wherein said common unit is connected to the combustion engine 10, generator 12, propulsion motors and actuator 40.

According to a variant of the second embodiment the driveline comprises an energy storage unit 50 arranged to store energy. The energy storage unit 50 is connected to the third power electronic unit 23 via a link 215 for providing the power electronic means with power. Herby drive of the vehicle with the combustion engine 10 shut off is facilitated wherein more silent drive is facilitated.

By using an electric propulsion motor, i.e. electric motor for propulsion of the articulated tracked vehicle II, in accordance with the second embodiment of the respective propulsion unit 200a, 200b, the driveline may be designed very compact which results in good saving of space for crew and/or payload. Further the device with electric propulsion unit 200a, 200b comprising propulsion motor and transmission configuration facilitates regulation of the output rotational speed of the respective drive shaft and thus controlling the respective vehicle.

FIG. 2b schematically illustrates a cross section of an electric propulsion unit 200a of the driveline according to FIG. 2a.

The electric propulsion unit 200a comprises a propulsion motor 201, i.e. an electric motor for propulsion of the articulated tracked vehicle II. an electric motor 201 per pair of first and second, and third and fourth drive shaft 6a-b, 6c-d respectively. The propulsion motor 201 is arranged per pair of first and second drive wheel 5a, 5b to drive first and second drive wheels 5a, 5b (see FIG. 2a) by being arranged per pair of first and second drive shafts 6a, 6b to rotate opposite drive shafts. The propulsion motor 201 has a rotor 201a arranged to rotate and a stator 201b being fixedly secured, e.g. in a housing of a gearbox for the transmission configuration 202.

The electric propulsion unit 200a further comprises a transmission configuration 202 connected to the propulsion motor 201 and arranged to transfer the rotational speed from the rotor 201a of the propulsion motor 201 to the opposite drive shafts 6a, 6b for driving of the drive wheels connected to the respective drive shaft.

The transmission configuration 202 comprises a planetary gearing 230 connected to the rotor 201a. The planetary gearing comprises a son wheel 231, planet wheel 232 and a ring wheel 233. The sun wheel 231 is connected to the rotor 201a via a shaft such that the sun wheel 231 is arranged to be rotated by means of the rotor 201a. The planetary gearing 230 has a high gear position H in which the entire planetary gearing 230 with the ring wheel 233 rotates with an input shaft of the planetary gearing 230. The planetary gearing 230 further has a low gear position L in which the ring wheel is locked and the planet wheels 232 rotate with the sun wheel 231 which provides a gear reduction on the output shaft such that it rotates with a lower rotational speed.

The transmission configuration 202 also comprises a first reduction gear 240a connected to the first drive shaft 6a and a second reduction gear 240b connected to the second drive shaft 6b. The transmission configuration 202 also comprises a differential 260 arranged to adapt the speed between the drive wheels. The first reduction gear 240a and the second reduction gear 240b are connected to each other via the differential 260.

The first reduction gear 240a is further connected to the planetary gearing 230. The first reduction gear 240a is arranged to reduce the rotation coming from the planetary gearing 230 such that a lower rotational speed but higher torque is obtained to the drive shaft 6a.

The first reduction gear 240a comprises a sun wheel 241, planet wheels 242 and a ring wheel 243. The first reduction gear 240a is connected to the first drive shaft 6a via its planet wheels 242 for providing gear reduction. The second reduction gear 240b comprises a sun wheel 244, planet wheels 245 and a ring wheel 246. The second reduction gear 240b is connected to the second drive shaft 6b via its planet wheel 245 for provision of gear reduction.

The first and second reduction gear 240a, 240b are further connected to each other via a shaft 247 connected to the sun wheel 241, 244 of the respective reduction gear 240a, 240b. The first and second reduction gear 240a, 240b are connected via the differential 260 between the respective ring wheel.

In the high range position H of the transmission configuration 202 the sun wheel 241, 244 of the first and second reduction gear 240a, 240b rotates with a higher rotational speed. The ring wheel 243, 246 of the first and second reduction gear 240a, 240b is always locked. The planet wheels 242, 245 of the first and second reduction gear 240a, 240b rotate with its respective sun wheel 241, 244 which results in a gear reduction on the respective drive shaft 6a, 6b such that it rotates with a lower rotational speed. The ring wheel 233 is in the low gear position L arranged to be locked to the housing of the gear box and in a high gear position H arranged to be locked to the input shaft of the sun wheel running from the rotor 201a.

The electric propulsion unit 200a according to a variant further comprises an electric motor 270 arranged in connection to the differential 260 to regulate output rotational speed to in such a way facilitate control of the respective drive wheel and thus steering of the vehicle unit in which the electric propulsion unit 200a is arranged. This results in the advantage that in case the steering of the control coupling/control member would fail, redundancy in the form a steering by means of each track is possible.

Each reduction gear 240a, 240b is a type of planetary gearing. Due to the fact that each transmission configuration of the first embodiment is built up of a planetary gearing/ reduction gear a compact construction is obtained which results in more space for crew and/or payload.

The articulated tracked vehicle comprises a brake device 250a, 250b for the respective drive wheel arranged to brake the respective drive shaft 6a, 6b. Any suitable brake device could be used, such as brake drum, electric brake, disc brake or wet brake.

Above a transmission configuration 202 suitable for the second embodiment of the present invention has been described. Any suitable configuration of electric propulsion unit/transmission configuration could be used though.

Figure 3:
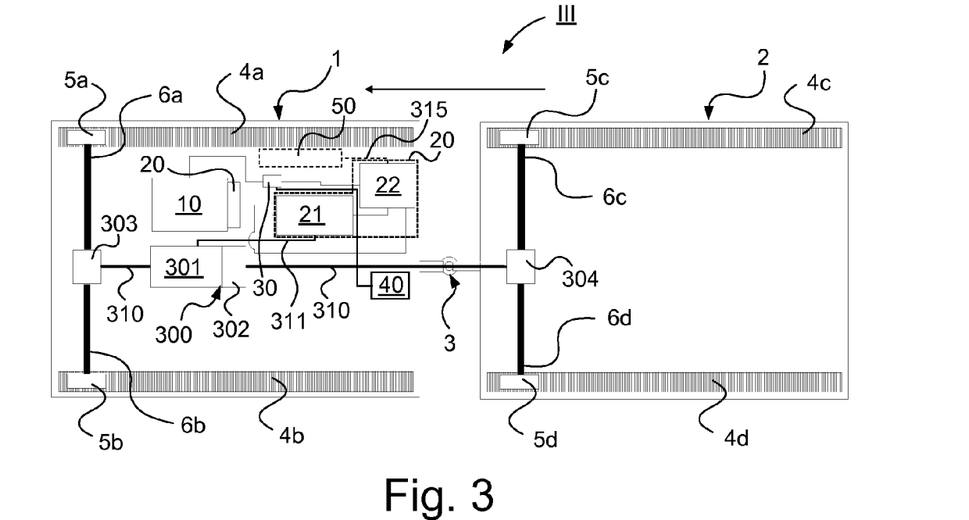
FIG. 3 schematically illustrates an articulated tracked vehicle with a driveline according to a third embodiment of the present invention.

FIG. 3 schematically illustrates an articulated tracked vehicle III with a driveline according to a third embodiment of the present invention.

The driveline comprises a combustion engine 10, e.g. e diesel engine, and a generator 12, wherein the combustion engine 10 is arranged to drive the generator 12.

The driveline further comprises an electric propulsion unit 300 arranged in the front vehicle unit comprising a propulsion motor 301 arranged to drive a shaft 310 running in the longitudinal direction of the vehicle IV. The propulsion motor 301 is via the shaft 310 connected to the first and second drive shaft 6a, 6b via a first shaft gear/differential 303 and arranged to drive the first and second drive wheel 5a, 5b, the first shaft gear/differential 303 being arranged in the first vehicle unit 1 in connection to the first and second drive shaft 6a, 6b.

The propulsion motor 301 is further connected to the third and fourth drive shaft 6c, 6d via a second shaft gear/differential 304 and arranged to drive the third and fourth drive wheel 5c, 5d, the second shaft gear/differential 304 being arranged in the second vehicle unit 2 in connection to the third and fourth drive shaft 6c, 6d.

The electrical propulsion unit 300 further comprises a transmission configuration 302 connected to the propulsion motor 301. The transmission configuration 302 is according to this variant arranged behind the propulsion motor 301. The propulsion motor 301 and the transmission configuration 302 are arranged in connection to the shaft 310 running in the longitudinal direction of the vehicle. The shaft 310 is coupled in its front end to said first shaft gear/differential 303. The main shaft 310 is coupled in its rear end to said second shaft gear/differential 304.

The driveline further comprises power electronic means 20 connected to the generator 12 and arranged to receive power from the generator 12, wherein said power electronic means 20 are arranged to transfer power to the propulsion motor 301. The power electronic means 20 comprises a first power electronic unit 21 and a second power electronic unit 22, the first and second power electronic unit 21, 22 being connected to each other. The first power electronic unit 21 is arranged to transfer power to the first propulsion motor 301 via a first link 311.

The propulsion motor 301 is here constituted by an electric motor for propulsion of the articulated tracked vehicle III.

The articulated tracked vehicle further comprises the electronic control unit 30. The electronic control unit 30 is signal connected to the combustion engine 10 for controlling the combustion engine 10 via a link. The electronic control unit 30 is further signal connected to said power electronic means 20 wherein the electronic control unit 30 is arranged to control the first power electronic unit 21 via a link and the second power electronic unit 22 via a link. The electronic control unit 30 is arranged to communicate between combustion engine 10 and power electronic means 20. The electronic control unit 30 is signal connected to the actuator 40 for power request via a link 315.

According to a variant the electronic control unit 30 and the power electronic means 20 could be constituted by a common unit for control and communication between combustion engine 10 and propulsion motors, wherein said common unit is connected to combustion engine 10, generator 12, propulsion motor 301 and actuator 40.

According to a variant of the second embodiment the driveline comprises an energy storage unit 50 arranged to store energy. The energy storage unit 50 is connected to the second power electronic unit via a link 315 for providing the power electronic means 20 with power. Hereby drive of the articulated tracked vehicle III with the combustion engine 10 shut off is facilitated wherein more silent drive is facilitated.

An advantage with a driveline according to the third embodiment is that propulsion motor 301, i.e. electric motor for propulsion of the articulated tracked vehicle III, may be arranged on an existing mechanical driveline and consequently upgrading of an articulated tracked vehicle with conventional mechanical driveline may be provided relatively easy and cost efficient.

Figure 4:
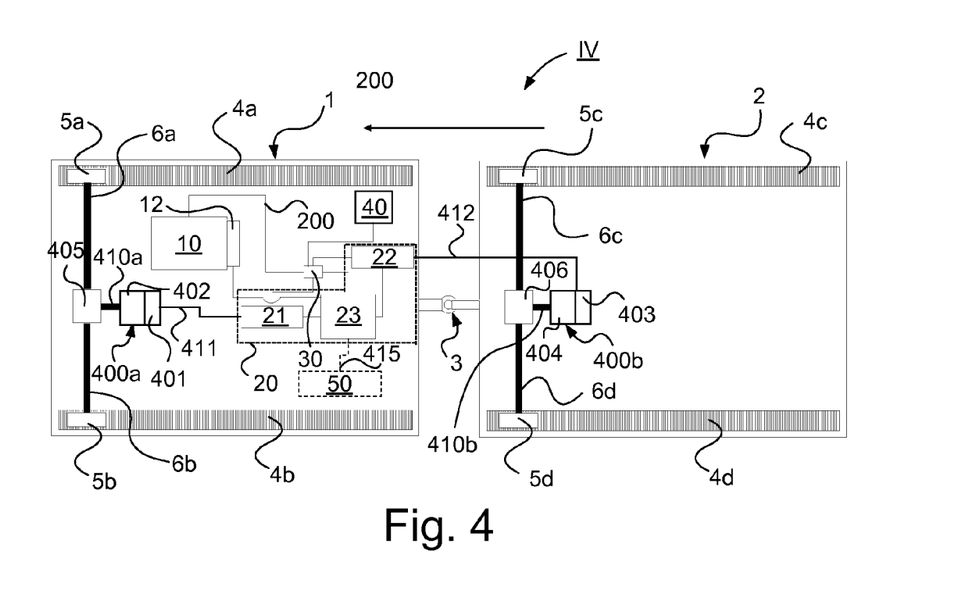
FIG. 4 schematically illustrates an articulated tracked vehicle with a driveline according to a fourth embodiment of the present invention.

FIG. 4 schematically illustrates an articulated tracked vehicle IV with a driveline according to a fourth embodiment of the present invention.

The driveline comprises a combustion engine 10, e.g. a diesel engine, and a generator 12, wherein the combustion engine 10 is arranged to drive the generator 12.

The driveline further comprises a first electrical propulsion unit 400a arranged in the front vehicle unit and comprising a first propulsion motor 401 arranged to drive a first shaft 410a running in the longitudinal direction of the vehicle IV. The first propulsion motor 401 is via a the first shaft 410a connected to the first and second drive shaft 6a, 6b via a first shaft gear/differential 405 and arranged to drive the first and second drive wheel 5a, 5b, the first shaft gear/differential 405 being arranged in the first vehicle unit 1 in connection to the first and second drive shaft 6a, 6b.

The driveline further comprises a second electric propulsion unit 400b arranged in the rear vehicle unit and comprising a second propulsion motor 402 arranged to drive a second shaft running in the longitudinal direction of the vehicle IV. The first propulsion motor 401 is via the second shaft 410b connected to the third and fourth drive shaft 6c, 6d via a second shaft gear/differential 406 and arranged to drive the third and fourth drive wheel 5c, 5d, the second shaft gear/differential being arranged in the second vehicle unit 2 in connection to the third and fourth drive shaft 6c, 6d.

The first electric propulsion unit 400a further comprises a first transmission configuration 402 arranged in connection to the first propulsion motor 401. The first transmission configuration 402 is according to this variant arranged behind the first propulsion motor 401. The first propulsion motor 401 and the first transmission configuration 402 are arranged in connection to the longitudinal first shaft 410a. The first shaft 410a is coupled in its front end to said first shaft gear/differential 405 and in its rear end to said first transmission configuration 402 and first propulsion motor. The first propulsion motor is arranged to drive said first main drive shaft.

The second electric propulsion unit 400b further comprises a second transmission configuration 404 arranged in connection to the second propulsion motor 403. The second transmission configuration 404 is according to this variant arranged behind the second propulsion motor 403. The second propulsion motor 403 and the second transmission configuration 404 are arranged in connection to the longitudinal second shaft 410b. The second shaft 410b is coupled in its front end to said second shaft gear/differential 406 and in its rear end to said second transmission configuration 404 and second propulsion motor 403.

The driveline further comprises power electronic means 20 connected to the generator 12 and arranged to receive power from the generator 12, wherein said power electronic means 20 are arranged to transfer power to the respective propulsion motor 402, 403. The power electronic means comprises a first power electronic unit 21, a second power electronic unit 22 and a third power electronic unit 23, the first, second and third power electronic units being connected to each other. The first power electronic unit 21 is arranged to transfer power to the first propulsion motor 401 via a first link 411. The second power electronic unit 22 is arranged to transfer power to the second propulsion motor 404 via a second link 411.

Each propulsion motor 401, 403 is here constituted by an electric motor for propulsion of the articulated tracked vehicle IV.

The articulated tracked vehicle further comprises the electronic control unit 30. The electronic control unit 30 is signal connected to the combustion engine 10 via link for controlling the combustion engine 10. The electronic control unit 30 is further signal connected to said power electronic means 20 wherein the electronic control unit 30 is arranged to control the first power electronic unit 21 via a link, the second power electronic unit 22 via a link, and the third power electronic unit 23 via link. The electronic control unit 30 is arranged to communicate between combustion engine 10 and power electronic means 20. The electronic control unit 30 is signal connected to the actuator 40 for power request via a link.

According to a variant the electronic control unit 30 and the power electronic means 20 could be constituted by a common unit for control and communication between combustion engine 10 and propulsion motors 401, 403, wherein said common unit is connected to combustion engine 10, generator 12, propulsion motors 401, 403 and actuator 40.

According to a variant of the second embodiment the driveline comprises an energy storage unit 50 arranged to store energy. The energy storage unit 50 is connected to the third power electronic unit 23 via a link 415 for providing the power electronic means with power. Thereby drive of the articulated tracked vehicle IV with the combustion engine 10 shut off is facilitated wherein more silent drive is facilitated.

By arranging propulsion motor 401, 403, i.e. electric motor, e.g. steering motor, in accordance with the fourth embodiment directly on the transmission configuration 402, 404 in the form of shaft gears a relatively simple construction which is reliable is obtained, since existing shaft gear is already tried out, and no new differential of the shaft gear needs to be constructed. Further problem with design of a new brake system is eliminated. By arranging a propulsion motor 401, 403 per vehicle unit in accordance with the fourth embodiment redundancy in case any of the propulsion motors would fail is obtained. The construction with an electric propulsion unit 400a, 400b, i.e. propulsion motor connected to transmission configuration, in each vehicle unit facilitates a relatively compact solution such that more space for crew and/or payload is set free.

Figure 5:
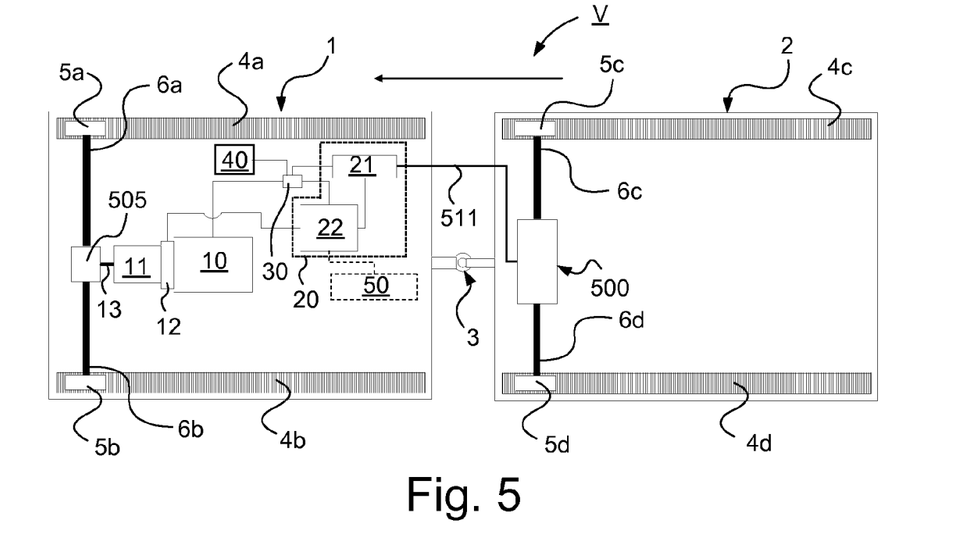
FIG. 5 schematically illustrates an articulated tracked vehicle with a driveline according to a fifth embodiment of the present invention.

FIG. 5 schematically illustrates an articulated tracked vehicle V with a driveline according to a fifth embodiment of the present invention.

The driveline comprises a combustion engine 10, e.g. a diesel engine, and a generator 12, wherein the combustion engine 10 is arranged to drive the generator 12. The generator 12 is according to this embodiment arranged in front of the combustion engine 10.

The combustion engine 10 is connected to the first and second drive shaft 6a, 6b via a shaft gear/differential 505, wherein the combustion engine 10 is arranged to drive the first and second drive wheel 5a, 5b via said shaft gear/differential.

A first transmission configuration is arranged in connection to the combustion engine 10. The first transmission configuration 11 is according to this variant arranged in front of the generator 12. The combustion engine 10 and first transmission configuration 11 constitute a mechanical propulsion unit. The combustion engine 10 and first transmission configuration 11 are arranged to drive a shaft 13 running in the longitudinal direction of the vehicle. The shaft 13 is coupled in its front end to said first drive shaft/differential 505 and in the rear end with the transmission configuration 11/combustion engine 10.

The driveline further comprises an electric propulsion unit 500 arranged in the rear vehicle unit comprising a propulsion unit 501 and second transmission configuration 502 connected to the third and fourth drive shaft 6c, 6d and arranged to drive the third and fourth drive wheel 5c, 5d.

The driveline further comprises power electronic means 20 connected to the generator 12 and arranged to receive power from the generator 12, wherein said power electronic means 20 are arranged to transfer power to the propulsion motor 501. The power electronic means 20 comprises a first power electronic unit 21 and a second power electronic unit 22, the first and second power electronic unit being connected to each other. The first power electronic unit 21 is arranged to transfer power to the propulsion motor 501 via link 511.

The propulsion motor 501 of the electric propulsion unit is constituted by an electric motor for propulsion of the articulated vehicle V.

The articulated vehicle further comprises the electronic control unit 30. The electronic control unit 30 is signal connected to the combustion engine 10 for controlling the combustion engine 10 via a link. The electronic control unit 30 is further signal connected to said power electronic means 20 wherein the electronic control unit 30 is arranged to control the first power electronic unit 21 via a link and the second power electronic unit 22 via a link. The electronic control unit 30 is arranged to communicate between combustion engine 10 and power electronic means 20. The electronic control unit 30 is signal connected to the actuator 40 for power request via a link.

According to a variant the electronic control unit 30 and the power electronic means 20 could be constituted by a common unit for control and communication between combustion engine 10 and propulsion motor 501, wherein said common unit is connected to combustion engine 10, generator 12, propulsion motor 501 and actuator 40.

According to a variant of the second embodiment the driveline comprises an energy storage unit 50 arranged to store energy. The energy storage unit 50 is connected to the second power electronic unit 22 via a link 515 for providing the power electronic means 22 with power. Hereby drive of the vehicle with the combustion engine 10 shut off is facilitated wherein more silent drive is facilitated.

By means of the device according to the fifth embodiment mechanical drive by means of the mechanical electric propulsion unit, electric drive by means of the electric propulsion unit 500 or a combination of mechanical and electric drive by means of the mechanical and electrical propulsion unit is facilitated.

According to a variant the electric propulsion unit may be utilized at lower speeds and be replaced by the mechanical propulsion unit at higher speeds. The device according to the fifth embodiment facilitates construction the electrical propulsion unit 500 such that this is only used for half the maximal speed wherein lower rotational speed is obtained. Hereby no distribution box and also no cardan shaft under combustion engine, to a certain extent free placement of components which facilitates a more compact construction than conventional driveline and is consequently space saving.

Figure 6:
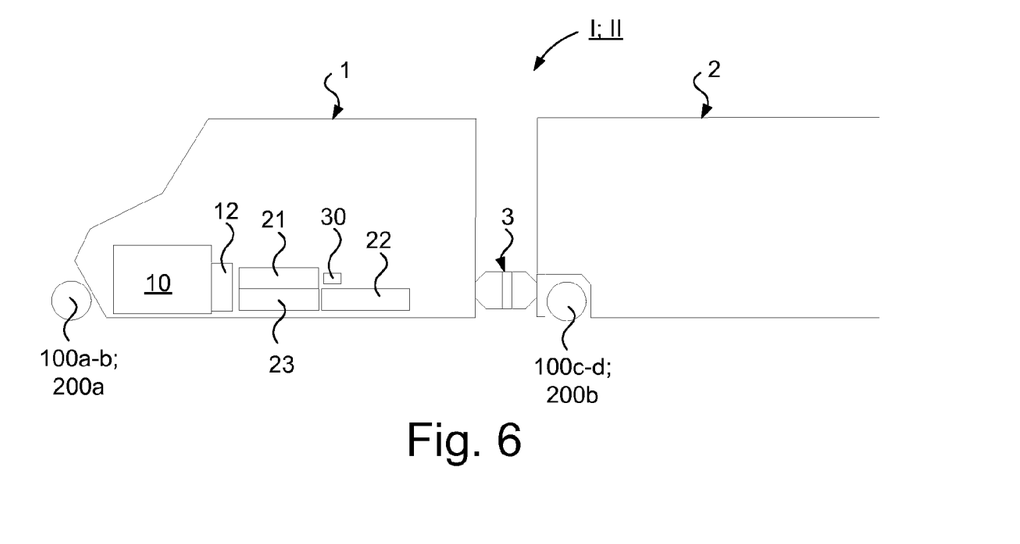
FIG. 6 schematically illustrates a side view of an articulated tracked vehicle with a driveline according to an embodiment of the present invention.

FIG. 6 schematically illustrates a side view of an articulated tracked vehicle with a driveline according to an embodiment of the present invention. Hereby placement of driveline in accordance with the first or second embodiment is illustrated.

The articulated tracked vehicle I; II comprises the front vehicle unit 1 and the rear vehicle unit 2 controllably interconnected by means of the control coupling/control member 3. In the front vehicle unit the combustion engine 10 is arranged in the front portion, the generator 12 is arranged behind the combustion engine 10 and the first, second and third power electronic units 21, 22, 23 and electronic control unit 30 behind the generator 12. The electric propulsion units 100a-d; 200a-b are arranged in connection to the drive wheels of the respective vehicle unit 1, 2.

Above different embodiments of an articulated tracked vehicle comprising a first vehicle unit 1 and a second vehicle unit 2 controllably connected by means of a control member 3, the combustion engine 10 being arranged to drive a generator 12 for electric generation, wherein the generator 12 is arranged to transfer power to at least one electric motor of at least one electric propulsion unit via power electronic means 20. Hereby no mechanical power transfer from the combustion engine to drive wheels of the vehicle is required, wherein relatively free placement of electric motor/propulsion unit is facilitated. Consequently electric motor/propulsion unit may be arranged in connection to the respective vehicle unit and consequently, depending on embodiment and design of the vehicle unit be placed in the vehicle body of first and/or second vehicle unit 1, 2, outside of the vehicle body of the first and/or second vehicle unit 1, 2 and/or between first and second vehicle unit 1, 2.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. An articulated tracked vehicle comprising a first vehicle unit and a second vehicle unit controllably connected by means of a control member, wherein each vehicle unit comprises two driven tracks driven by drive wheels and consists of one electric motor per track for driving a respective drive wheel via drive shafts for propulsion of the vehicle, wherein the first vehicle unit comprises a combustion engine, wherein the combustion engine is arranged to drive a generator for electric power generation, wherein the generator is arranged to transfer electric power via power electronics to the electric motors of each vehicle unit, wherein propulsion of the vehicle is arranged to be effected only electrically, and wherein power transfer between said vehicle units is arranged to be effected only electrically.

2. An articulated tracked vehicle according to claim 1, wherein each electric motor is part of an electric propulsion unit that further comprises a transmission configuration arranged to transfer power for propulsion of the vehicle.

3. An articulated tracked vehicle according to claim 2, wherein the transmission configuration comprises at least one planetary gearing.

4. An articulated tracked vehicle according to claim 3, comprising an energy storage unit arranged to supply energy to said power electronics.

5. An articulated tracked vehicle according to claim 2, comprising an energy storage unit arranged to supply energy to said power electronics.

6. An articulated tracked vehicle according to claim 1, comprising an energy storage unit arranged to supply energy to said power electronics.

* * * * *